United States Patent
Maurer et al.

(10) Patent No.: US 8,405,257 B2
(45) Date of Patent: Mar. 26, 2013

(54) DIRECT CURRENT MACHINE

(75) Inventors: Erik Maurer, Buehlertal (DE);
Wolfgang Winkler, Schutterwald (DE);
Markus Heidrich, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 808 days.

(21) Appl. No.: 12/594,109

(22) PCT Filed: Feb. 6, 2008

(86) PCT No.: PCT/EP2008/051459
§ 371 (c)(1),
(2), (4) Date: Sep. 30, 2009

(87) PCT Pub. No.: WO2008/119579
PCT Pub. Date: Oct. 9, 2008

(65) Prior Publication Data
US 2010/0045128 A1 Feb. 25, 2010

(30) Foreign Application Priority Data
Mar. 30, 2007 (DE) .......................... 10 2007 015 782

(51) Int. Cl.
*H02K 5/14* (2006.01)
*H02K 5/22* (2006.01)
(52) U.S. Cl. ............... 310/43; 310/89; 310/239; 310/71
(58) Field of Classification Search .................... 310/43, 310/71, 89, 177, 239–247
See application file for complete search history.

(56) References Cited

U.S. PATENT DOCUMENTS

| | | | |
|---|---|---|---|
| 4,501,983 A | 2/1985 | Schmider | |
| 4,851,730 A * | 7/1989 | Fushiya et al. | 310/249 |
| 4,895,536 A | 1/1990 | Gingerich et al. | |

FOREIGN PATENT DOCUMENTS

| | | |
|---|---|---|
| DE | 3632385 A1 | 4/1988 |
| FR | 2855668 A1 | 12/2004 |
| GB | 2013417 A | 8/1979 |
| JP | 5694945 A | 7/1981 |
| JP | 60176453 U | 11/1985 |
| JP | 428753 Y2 | 7/1992 |
| JP | 568353 A | 3/1993 |
| JP | 8331790 A | 12/1996 |
| JP | 200768379 A | 3/2007 |
| WO | 03007458 A2 | 1/2003 |

* cited by examiner

*Primary Examiner* — Tran N. Nguyen
*Assistant Examiner* — David Scheuermann
(74) *Attorney, Agent, or Firm* — Michael Best & Friedrich LLP

(57) ABSTRACT

The invention relates to a DC current machine, in particular a DC current motor for driving a blower of a motor vehicle, with a pole housing forming the stator of the machine, a rotor that is rotatably mounted in two bearing plates, and with a brush support for supplying current to the rotor. According to the invention, a support is integrated into the brush support, with de-tensioning for the electrical connecting cables of the machine, which means that a secure fastening, de-tensioning, and insulation of the connecting cables is achieved without additional components and without additional expense in the assembly of the machine.

18 Claims, 3 Drawing Sheets

DIRECT CURRENT MACHINE

CROSS-REFERENCE TO RELATED APPLICATION

This application is a 35 USC 371 application of PCT/EP2008/051459 filed on Feb. 6, 2008.

BACKGROUND OF THE INVENTION

1. Field of the Invention

The invention is based on a direct current machine, in particular a direct current motor for driving the blower of a motor vehicle, as generically defined by the preamble to the independent claim.

2. Description of the Prior Art

For that purpose, two-pole direct current brush motors for use in heating and air conditioning blowers of motor vehicles are known, which have a mechanical tension relief for the exit of the individual cables of the positive and negative lines, the tension relief being embodied with additional fixtures. Such arrangements require that separate parts be furnished and assembled, making production more complicated on the one hand and on the other making assembly more complex when the machine is put together, thus increasing the production cost.

ADVANTAGES AND SUMMARY OF THE INVENTION

The embodiment according to the invention of a direct current has the advantage that because of the integration of a tension relief for the connection cables into the design of the brush support, the necessity of furnishing and assembling additional components is dispensed with, so that the production effort and expense for the machine can be reduced. Advantageously, the mount for the electrical connection cables is embodied in one piece with the brush support, expediently in the form of a plastic injection-molded part.

It has furthermore proved advantageous if the mount has at least one elastically deformable strut that at least partly embraces at least one electrical connection cable and that as early as the assembly process and in particular in the finished machine exerts a predetermined pressure on the connection cable and simultaneously serves the purpose of mounting and tension relief. Expediently, the mount for each connection cable has a separate, elastically deformable strut, which is shaped and dimensioned to suit the connection cable to be locked, in such a way that it already locks the cable upon assembly and thus makes the production of the machine easier.

Economy in terms of assembly parts is also attained because the mount for the connection cables is fastened between one edge of the pole housing and a bearing plate, and upon assembly of the machine, a force that reduces the receiving cross section for the connection cable is exerted on the strut or struts, so that the connection cable is securely locked, and tensile forces acting on the cable are intercepted by the mount.

Further details and advantageous features of the invention will become apparent from the dependent claims and the description of an exemplary embodiment of the invention.

BRIEF DESCRIPTION OF THE DRAWINGS

One exemplary embodiment of the invention is described in further detail in the ensuing description in conjunction with the drawings, in which.

DESCRIPTION OF THE PREFERRED EMBODIMENT

Figure 1:
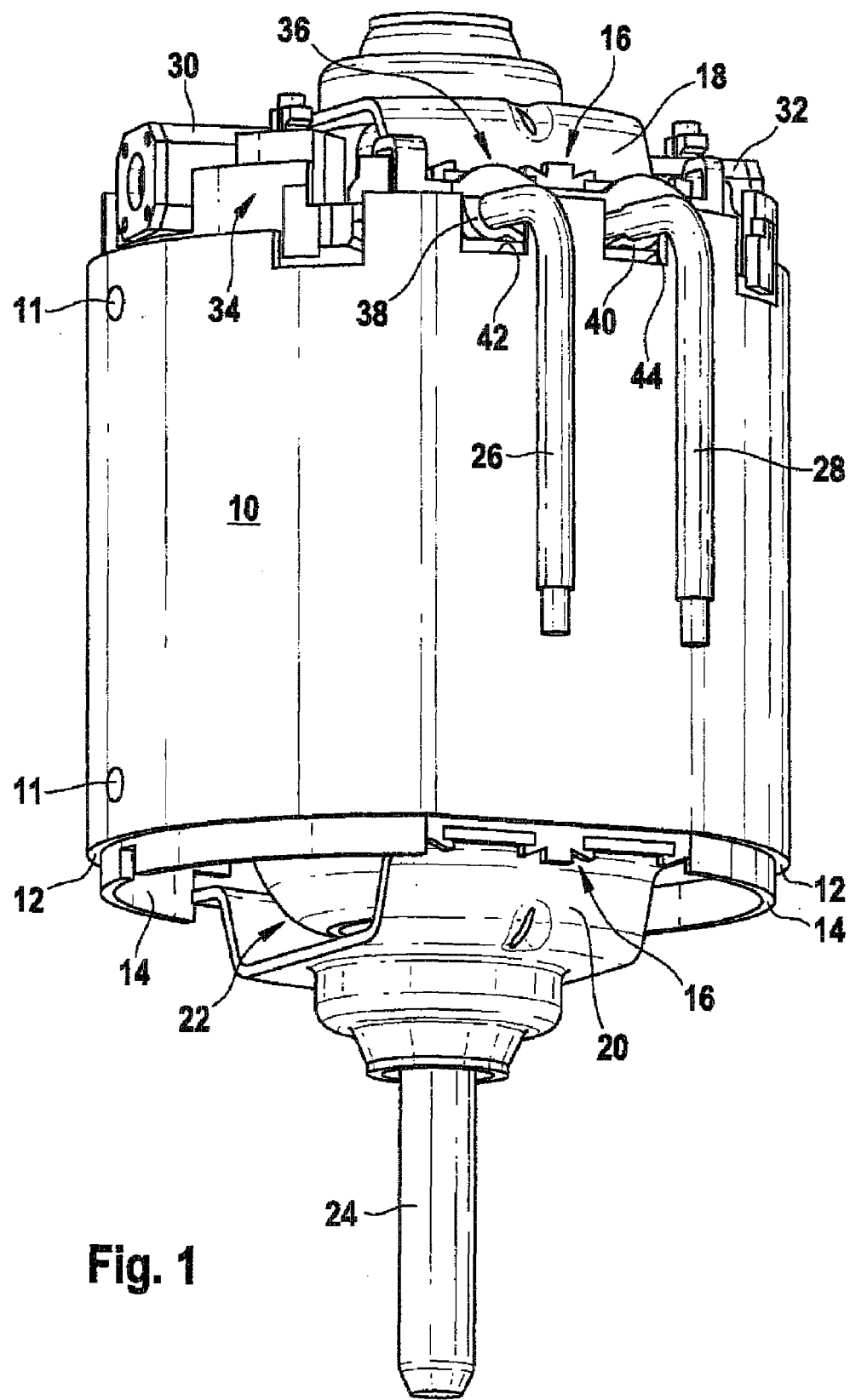
FIG. 1 shows a perspective overall view of the direct current machine of the invention.

In FIG. 1, a direct current motor is shown, of the kind used for example for a heating or air conditioning blower of motor vehicles. Reference numeral 10 indicates a double-layer pole housing, which in a known manner is shaped in a rolling operation into its hollow-cylindrical shape from two metal sheets 12 and 14 that are joined together at weld points 11. Two bearing plates 18 and 20, in which the rotor 22 of the machine is rotatably supported, are joined to the inner sheet 14 by dovetail-like calked features 16. Two stator poles, not visible in the drawing, are formed by permanent magnets secured on the inside to the pole housing 10. The power takeoff of the motor is effected via a rotor shaft 24.

For supplying current to the machine, two connection cables 26 and 28 are used, which can be connected to the positive and negative terminals of a direct voltage source and, via two brushes, not visible in the drawing, that are guided in brush holders 30 and 32 they supply the rotor 22 via a collector, likewise not visible.

Figure 2:
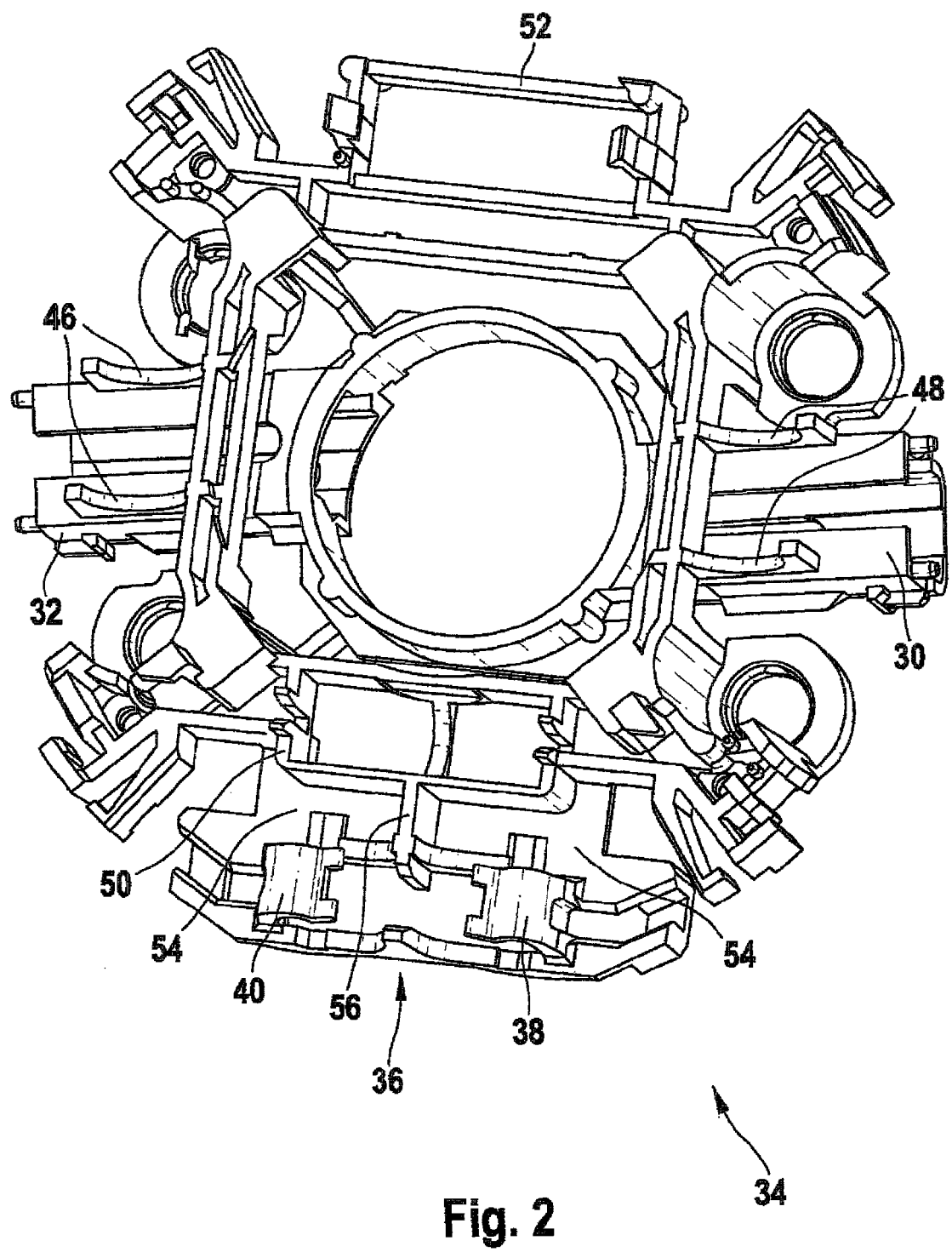
FIG. 2 is a perspective view of the brush support of the direct current machine with an integrally formed-on mount for the connection cables.

The brush holders 30 and 32 are part of a brush support 34, which is shown in detail in FIG. 2 and described in further detail in conjunction with it. An insulation mount 36 for the connection cables 26 and 28 is integrated with the brush support 34 and simultaneously serves as a tension relief for the cables. The essential parts of this mount are two struts 38 and 40, embodied as segments of a circle, which each embrace of the connection cables 26 and 28 and protrude into recesses 42 and 44 of the pole housing 10. Upon the assembly of the upper bearing plate 18, the struts 38 and 40 are pressed by the inner sheet-metal jacket 14, from the bottom of the recesses 42 and 44, against the connection cables 26 and 28, so that the struts 38 and 40 not only lock the connection cables upon assembly but also form the tension relief of the cables in the finished state of the machine. The cables 26 and 28 are braced on portions 66 and 68 (FIG. 3) of the insulation mount 36 that are located one above the other.

FIG. 2 in a perspective view shows the brush support 34 of the machine, with the integrally formed-on mount 36 for the connection cables 26 and 28. The mount 36 is made in one piece with the brush support 34 as a plastic injection-molded part. The view in FIG. 2 shows the brush support 34 from the inside of the machine, and the one-piece embodiment of the brush support 34 with the mount 36, and in particular with the struts 38 and 40 of the mount, is visible. In this view, besides the brush holders 30 and 32, two further holders 46 and 48 for receiving interference-suppression chokes, a holder 50 for receiving an interference-suppression capacitor, and a holder 52 for receiving a thermal switch can be seen, which are likewise integrally molded onto the brush support 34. The carbon brushes, not shown in the drawing, are disposed longitudinally displaceably in the brush holders 30 and 32 in a known manner and are preassembled on the brush support 34 with the built-in parts mentioned above and inserted as a structural unit into the machine between the pole housing 10 and the bearing plate 18. The mount 36 for the connection cables 26 and 28 is integrally formed onto the brush support 34 adjacent to the holder 50 and joined in one piece to the brush support 34 by means of both a platelike portion 54 and a wall portion 56.

Figure 3:
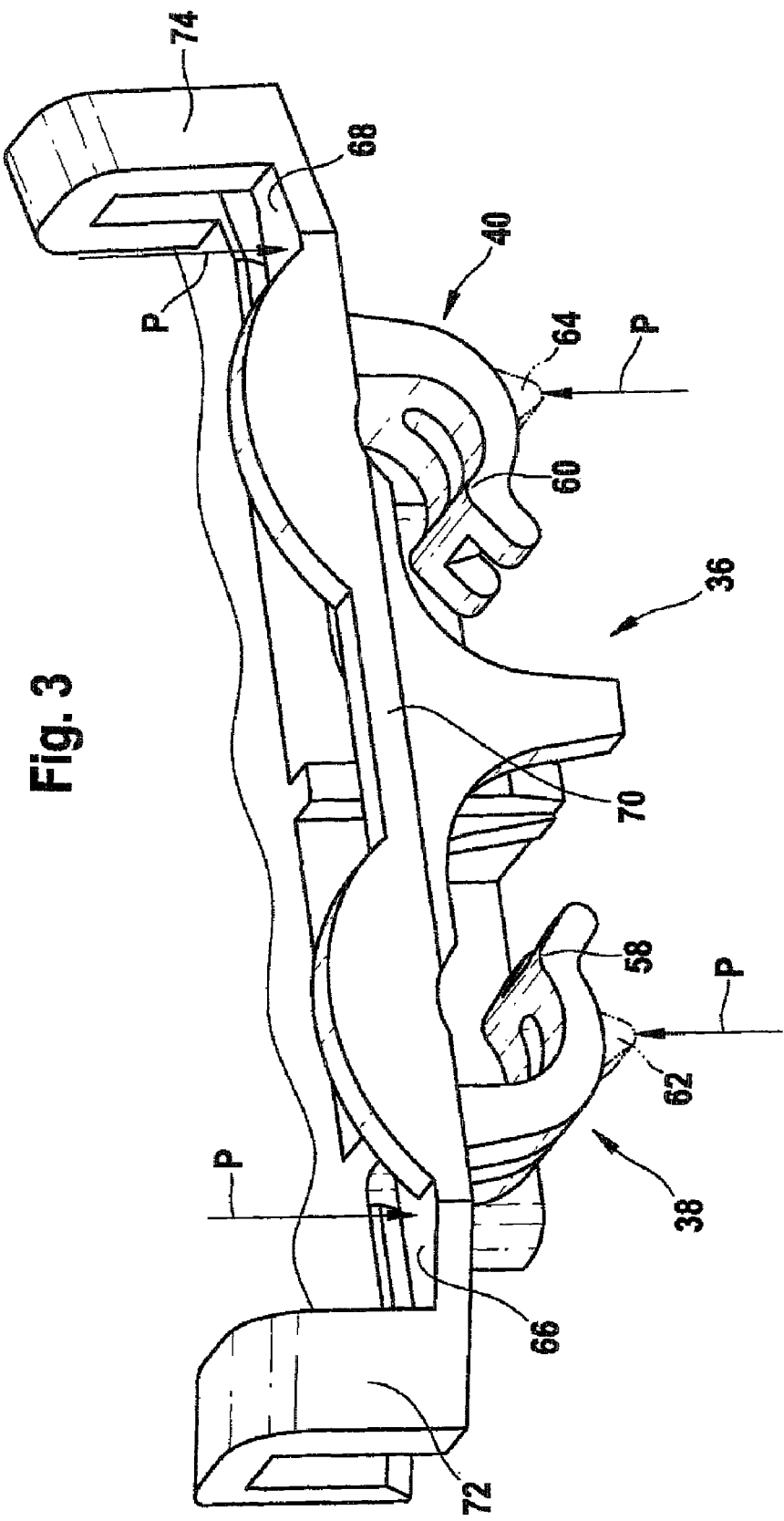
FIG. 3 is an enlarged perspective view of the mount for the connection cables of the machine.

FIG. 3 shows the mount 36 for the connection cables 26 and 28 in a further, enlarged, perspective view without the brush support 34. This view corresponds to the installed position of the mount 36 of FIG. 1, in which the struts 38 and 40 protrude downward. The struts 38 and 40 are elastically deformable and each embraces one connection cable. On one end, the struts are each integrally formed onto the mount 36, and on the opposite, open end they have thickened beadlike portions 58, 60, which additionally lock the connection cables in their position, after they have latched in place between the struts 38, 40 and the portions 66, 68 of the mount 36 that are located above them. This locking of the cables 26 and 28 is reinforced still further by the press fit upon installation between the pole housing 10 and the bearing plate 18; the peripheral portions of the recesses 42 and 44 exert pressure from below, and the flange of the bearing plate 18 exerts pressure from above, onto the struts 38 and 40. In the region of contact in the recesses 42 and 44, additional ribs 62 and 64 can be integrally formed onto the struts 38 and 40, in order to create defined contact points and contact forces. The contact pressure by the securing flange of the bearing plate 18 is exerted from above onto the portions 66 and 68 of the mount 36. The various contact pressure forces are indicated schematically by arrows P. The width of the struts 38 and 40 is dimensioned such that they protrude outward past the pole housing 10 and protect the cables 26, 28 against sharp-cornered edges of the pole housing. An outer connecting strut 70 and two U-shaped connecting portions 72 and 74 which connect to the brush support 34 increase the stability of the mount 36.

By the embodiment according to the invention of the direct current machine with a mount integrated with the machine, in particular with the brush support 34, and with tension relief for the electrical connection cables 26, 28, secure locking of the insulated connection cables is attained, virtually at no additional expense, along with simultaneously easier assembly of the machine. Because of the recesses 42 and 44 in the pole housing 10, the alignment of the components upon assembly is facilitated still further, and protection for the struts 38 and 40 is attained. The struts simultaneously generate a friction lock and a form lock with the insulating jacket of the connection cables 26 and 28, since upon assembly they are easily pressed into the cable insulation. Additional components and work steps for the tension relief of the connection cables can be dispensed with.

The foregoing relates to the preferred exemplary embodiment of the invention, it being understood that other variants and embodiments thereof are possible within the spirit and scope of the invention, the latter being defined by the appended claims.

The invention claimed is:

1. A direct current machine for driving a blower of a motor vehicle, comprising:
    a pole housing forming a stator of the machine;
    a rotor rotatably supported in two bearing plates;
    a brush support for supplying current to the rotor; and
    a mount with tension relief for electrical connection cables of the machine being integrated with the brush support, wherein the mount has one separate strut for each of the electrical connection cables.

2. The direct current machine as defined by claim 1, wherein the mount for the electrical connection cables is embodied in one piece with the brush support.

3. The direct current machine as defined by claim 1, wherein the brush support and the mount for the connection cables are a one piece plastic injection-molded part.

4. The direct current machine as defined by claim 2, wherein the brush support and the mount for the connection cables are a one piece plastic injection-molded part.

5. The direct current machine as defined by claim 1, wherein the strut is elastically deformable.

6. The direct current machine as defined by claim 2, wherein the strut is elastically deformable.

7. The direct current machine as defined by claim 1, wherein the mount for the connection cables is fastened between the pole housing and a bearing plate, and a force that reduces a receiving cross section for the connection cable is exerted on the struts.

8. A direct current machine for driving a blower of a motor vehicle, comprising:
    a pole housing forming a stator of the machine;
    a rotor rotatably supported in two bearing plates;
    a brush support for supplying current to the rotor; and
    a mount with tension relief for electrical connection cables of the machine being integrated with the brush support, wherein separate mounting struts for each connection cable are integrally molded onto the mount on one side.

9. The direct current machine as defined by claim 1, wherein the struts protrude into recesses of the pole housing.

10. The direct current machine as defined by claim 8, wherein the struts protrude into recesses of the pole housing.

11. The direct current machine as defined by claim 1, wherein the struts are embodied essentially in the form of segments of a circle.

12. The direct current machine as defined by claim 8, wherein the struts are embodied essentially in the form of segments of a circle.

13. The direct current machine as defined by claim 11, wherein the struts have a thickened beadlike portion on their open end.

14. The direct current machine as defined by claim 12, wherein the struts have a thickened beadlike portion on their open end.

15. The direct current machine as defined by claim 1, wherein the struts include a concave portion and are configured to support a portion of the electrical connection cables in the concave portion.

16. The direct current machine as defined by claim 8, wherein the struts include a concave portion and are configured to support a portion of the electrical connection cables in the concave portion.

17. The direct current machine as defined by claim 1, wherein the struts protrude downwards from the mount.

18. The direct current machine as defined by claim 8, wherein the struts protrude downwards from the mount.

* * * * *